United States Patent [19]
Stucker

[11] Patent Number: 5,986,373
[45] Date of Patent: Nov. 16, 1999

| [54] | MAGNETIC BEARING ASSEMBLY |
|---|---|
| [76] | Inventor: Leland Stucker, 2803 Water Division Rd., Denmark, Wis. 54208-8836 |
| [21] | Appl. No.: 09/006,489 |
| [22] | Filed: Jan. 13, 1998 |
| [51] | Int. Cl.$^6$ .................................................. F16C 32/04 |
| [52] | U.S. Cl. ............................................. 310/90.5 |
| [58] | Field of Search ............................................. 310/90.5 |

[56] References Cited

U.S. PATENT DOCUMENTS

| 2,747,944 | 5/1956 | Baermann | 310/90.5 |
|---|---|---|---|
| 5,019,738 | 5/1991 | Weilbach et al. | 310/90.5 |
| 5,043,615 | 8/1991 | Oshima | 310/90.5 |
| 5,610,463 | 3/1997 | Dunfield et al. | 310/90.5 |
| 5,616,976 | 4/1997 | Fremery et al. | 310/90.5 |
| 5,619,083 | 4/1997 | Dunfield et al. | 310/90.5 |
| 5,635,785 | 6/1997 | Seale | 310/90.5 |

FOREIGN PATENT DOCUMENTS

| 2136371 | 2/1973 | Germany | F16C 32/00 |
|---|---|---|---|
| 2421853 | 11/1975 | Germany | F16C 32/04 |
| 54-139007 | 10/1979 | Japan | F16C 32/04 |
| 56-6918 | 1/1981 | Japan | F16C 32/04 |
| 57-97918 | 6/1982 | Japan | F16C 32/04 |
| 847443 | 7/1981 | U.S.S.R. | H02K 5/16 |
| 875121 | 10/1981 | U.S.S.R. | F16C 32/04 |
| 1141241 | 2/1985 | U.S.S.R. | F16C 32/04 |

*Primary Examiner*—Nestor Ramirez
*Assistant Examiner*—Burton S. Mullins
*Attorney, Agent, or Firm*—Terrance Siemens

[57] ABSTRACT

A novel magnetic bearing assembly is disclosed where mutually repulsing magnetic fields are generated between an inner housing and an outer housing. In the preferred embodiment, these fields are located in pairs of cooperating rings, one set of rings having the generated field being axially aligned and the other set having a radial alignment. Thus, one section of the housing is suspended within the other without any contact.

4 Claims, 4 Drawing Sheets

MAGNETIC BEARING ASSEMBLY

BACKGROUND OF THE INVENTION

1. Field of the Invention

The present invention relates to magnetic bearing assemblies. More specifically, it relates to a magnetic bearing assembly wherein a plurality of magnets are set in circular rings such that each side of the ring, either axially or radially has all one pole, either north or south. Thus these rings may be assembled with opposing poles pushing at one another and set in housings such that the opposing forces are set at right angles to suspend a desired object in a substantially frictionless manner. The present invention relates to environments where low friction applications would be useful, such as in a light fishing reel, or the novel arrangement described herein could be used in a decorative or promotional toy that could be set spinning for long periods of time. Alternatively, with modifications, the present invention could serve as a freewheel storage device.

2. Description of the Prior Art

The problem of lubrication and wear in bearings and axles is as old as the utilization of these devices. Various schemes have been devised to eliminate or reduce either or both of the problems with varying degrees of success. The present invention seeks to address these issues by providing a bearing and housing structure that uses the opposing force generated by like magnetic polarities. In the illustrated embodiments, magnets are set in circular arrangements with like polarities aligned either axially or radially. In the case of axial alignment, for instance, like poles would face each other and thus hold the two disks in a spaced apart relationship, one above or below the other. Likewise, two opposing outer and inner faces of radially disposed annular disks would share like polarities to maintain the inner disk in a fixed, spaced apart relationship from the outer disk. Thus, with sets of disks disposed in a housing, an inner portion of the housing could be suspended within an outer housing and would be freely rotatable within it. The resulting device would be substantially free of friction and would require no lubrication.

A number of relevant patents were found in a search at the U.S. Patent and Trademark Office and they are discussed hereinafter:

U.S. Pat. No. 5,043,615 issued on Aug. 27, 1991 to Shintaro Oshima discloses a non-contact bearing that uses magnetism. Axially magnetized cylindrical members, slightly different in radius and length, are disposed with opposite polarities relative to one another. Either of the members can act as the shaft in the apparatus. This is clearly dissimilar from the present invention in that the opposite polarities are proximate each other instead of the like polarities used in the instant invention.

In U.S. Pat. No. 5,616,976 issued on Apr. 1, 1997 to Johan K. Fremery et al. discloses an auxiliary bearing system. Though this invention discusses the contactless motion between the stator and the rotor induced by a magnetic field, there is no teaching of the present invention's axial and radial mutually repelling magnetic fields that serve to hold the inner portion of the device in a freely rotatable state.

In U.S. Pat. No. 5,635,784 issued on Jun. 3, 1997 to Joseph B. Seale there is disclosed a bearingless levitating rotor. As in the above patent, there is no teaching of the axial and radially disposed like polarities set to suspend two portions of a housing one within the other.

Lastly, U.S. Pat. Nos. 5,610,463 and 5,619,083 both issued to John C. Dunfield et al. on Mar. 11 and Apr. 8, respectively, 1997 disclose magnetic bearings for spindle motors. These are unlike the present invention in that they do not disclose utilizing the repulsion of like polarities to suspend a portion of the bearing housing within another portion of the housing.

None of the above inventions and patents, taken either singly or in combination, is seen to describe the instant invention as claimed.

SUMMARY OF THE INVENTION

The present invention is a novel magnetic bearing assembly where mutually repulsing magnetic fields are generated between an inner housing and an outer housing. In the preferred embodiment, these fields are located in pairs of cooperating rings, one set of rings having the generated field being axially aligned and the other set having a radial alignment. Thus, one section of the housing is suspended within the other without any contact.

Accordingly, it is a principal object of the invention to provide a novel magnetic bearing assembly where the repulsion between like polarities is used to suspend an inner housing both axially and radially within an outer housing.

It is another object of the invention to provide a novel magnetic bearing assembly where the magnetic repulsion is maintained by cooperating rings having a plurality of magnets embedded or otherwise located therein.

These and other objects of the present invention will become readily apparent upon further review of the following specification and drawings.

BRIEF DESCRIPTION OF THE DRAWING

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENT

Figure 1:
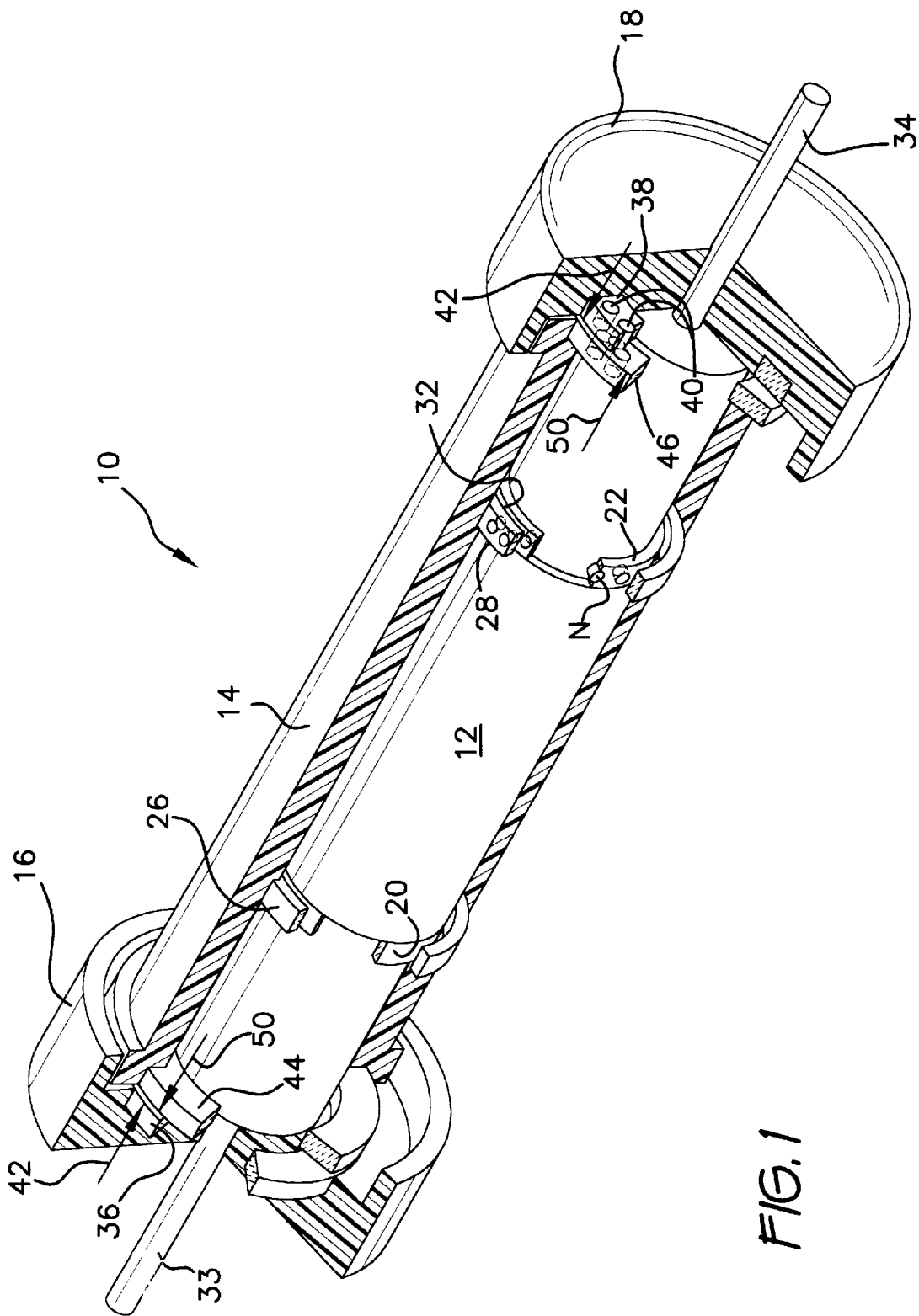
FIG. 1 is a partial cutaway perspective view of a first embodiment of the invention.
Figure 2:
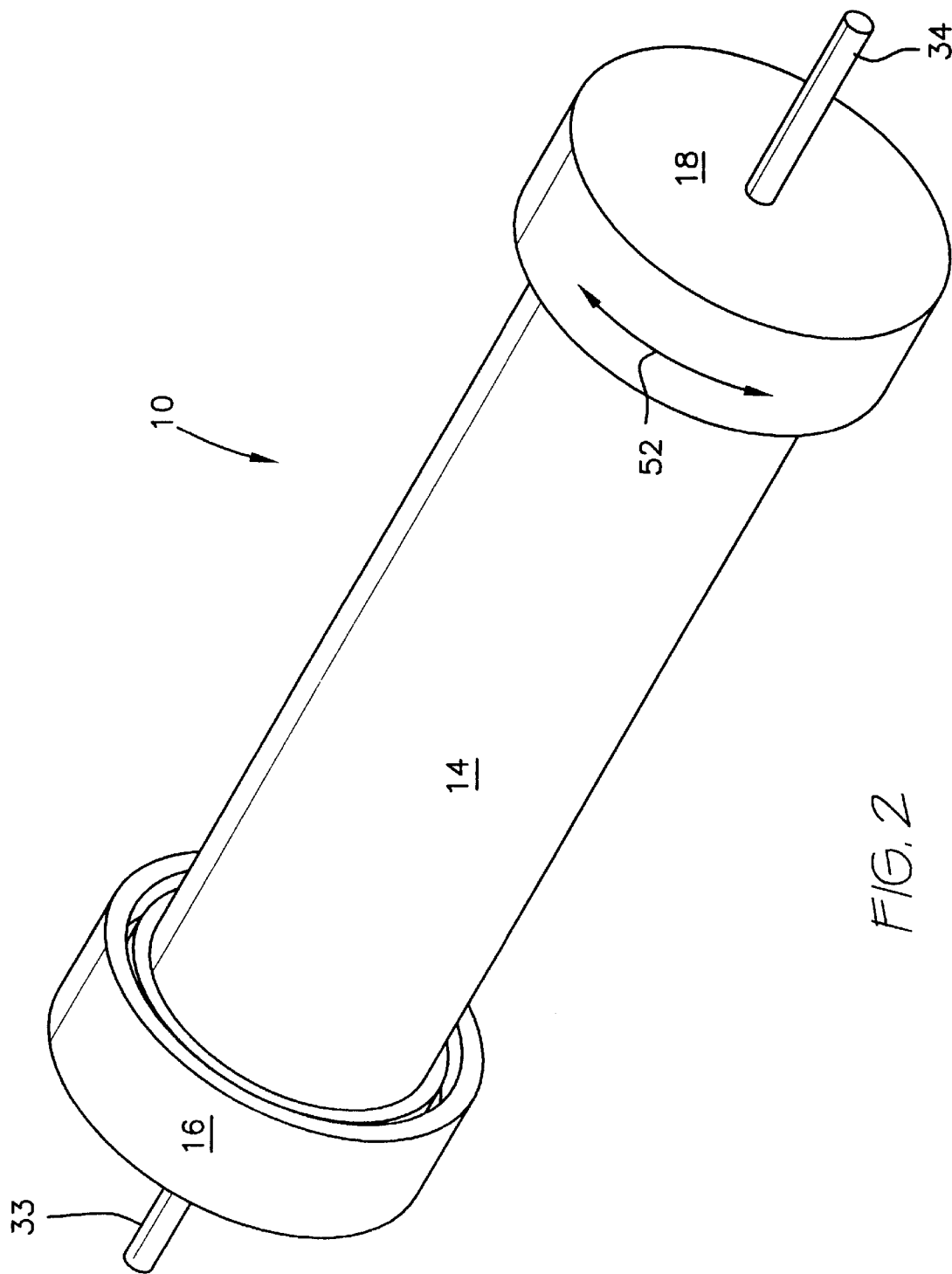
FIG. 2 is a perspective view of the first embodiment of the invention.
Figure 3:
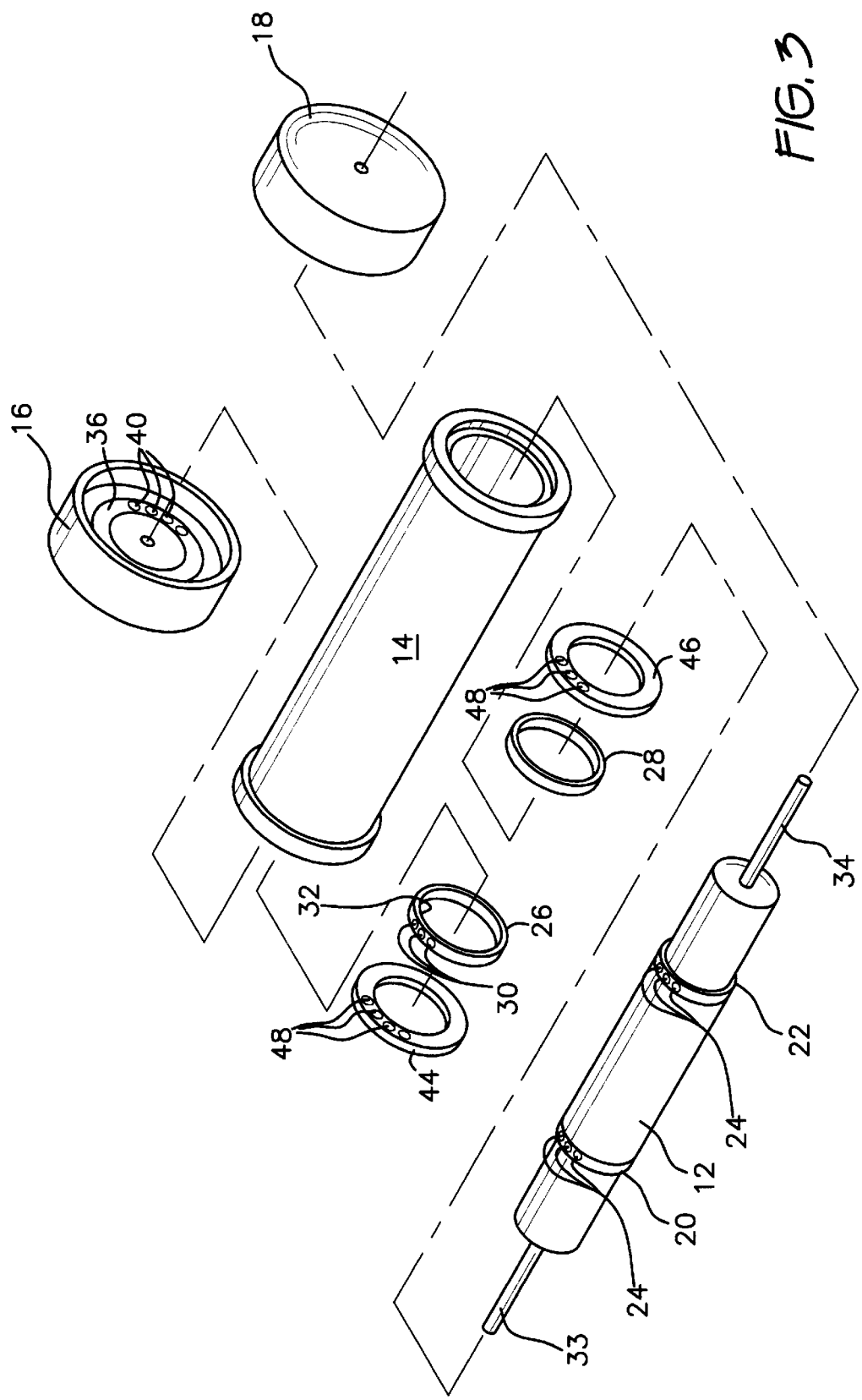
FIG. 3 is an exploded view of the first embodiment of the invention.

Turning first to FIGS. 1 and 3, the first embodiment of the invention will be described. The novel bearing mechanism itself is indicated at 10. It consists of an inner axle housing portion 12, an outer housing 14, and two end caps 16, 18. Positioned on the inner axle housing portion 12 are two inner magnet rings 20, 22. Turning to FIG. 3, it is seen that in the illustrated embodiment, these magnet rings are provided with a plurality of magnets 24 embedded or otherwise fixed within them. All of these magnets 24 are aligned so that one pole or the other, in this case the north pole (indicated at N) are located on the outer periphery of the rings 20, 22. Located on and attached to the outer housing 14 are a corresponding pair of outer magnet rings 26, 28. Embedded or otherwise fixed to these rings 26, 28 are a plurality of magnets 30. These magnets 30 are aligned so that the north pole (in the embodiment described herein) is directed inwardly as indicated at 32 in FIGS. 1 and 3. Thus, as seen in the cutaway view in FIG. 1, the rings 20, 26 and 22, 28 repel one another and the inner axle housing portion 12 is held within the outer housing 14. In this first embodiment, extending from the opposite ends of inner axle housing portion 12 are two axle shafts 33 and 34. These extend through and are threaded into end caps 16, 18 as seen in FIGS. 1 and 2. Located within the end caps 16, 18 respectively are magnetic rings 36 and 38. These rings 36, 38 are magnetized axially as opposed to the radial magnetization of rings 20, 22, 26, and 28. The magnets located within these rings 36, 38 are indicated at 40 and they are aligned so that all of the like poles (in this case north) are pointed in the same direction, as indicated at arrow 42. Located proximate the rings 36, 38 are corresponding rings 44, 46, respectively. These likewise have magnets 48 embedded therein and all of these magnets 48 are aligned so that there north poles (in this embodiment) are pointed in the direction indicated by arrow 50. Thus it can be seen the mutual repellence engendered by the like polarity of the magnets in rings 36, 44 and 38, 46 serves as a type of thrust bearing to hold inner axle housing portion 12 within outer housing 14. Thus when assembled, as seen in FIG. 2, the end caps 16 or 18 could be grasped and rotated in either of the directions indicated by arrow 52 and the spinning would continue until air resistance and what little frictional heat and hysteresis would affect the device conspired to slow it down. Preliminary tests have indicated that this spinning could continue for weeks. To recap: two sets of like polarity magnetized rings are brought proximate one another such that the polarity repels each from each. These sets are preferably at right angles to one another and are attached to an inner and an outer housing. Thus the inner housing is held suspended within the outer and is freely rotatable therein with one set of repelling rings serving as a suspension device and the second serving as a thrust bearing.

Figure 4:
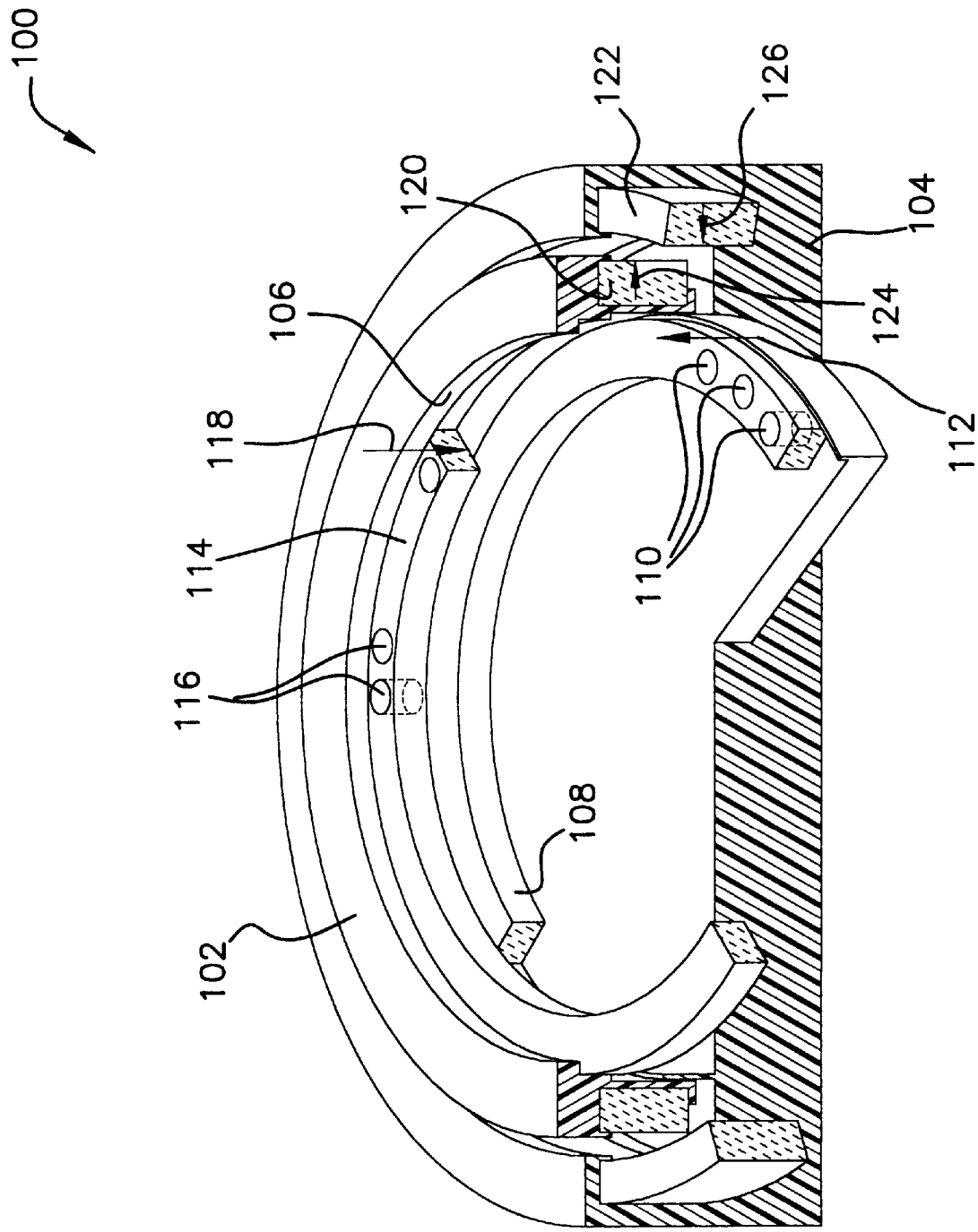
FIG. 4 is a partial cutaway perspective view of a second embodiment of the invention.

Turning now to FIG. 4, an alternative embodiment 100 of the invention will be discussed. In this embodiment, the end result is a flat, round floating and rotatable turntable like object. In FIG. 4, the entirety of the surface of the turntable is not seen, but a portion of the periphery is indicated at 102. The outer portion of the housing is indicated at 104 and the inner portion is indicated at 106. Located interiorly of the base of the outer portion 104 of alternative embodiment 100 is a magnetic ring 108. This ring 108 has a plurality of magnets embedded or located therein as indicated at 110. These magnets 110 are aligned such that like poles (north as indicated by N in FIG. 1) all point in the direction indicated by arrow 112. Above this magnetic ring 108 is its corresponding ring 114. This ring 114 has magnets, as indicated at 116, embedded therein and these are aligned so that like polarities (north in this embodiment) are all facing in the direction indicated by arrow 118. Thus the like polarities repel each other and, as in the first embodiment of the invention described hereinabove, the outer and the inner housings, 104 and 106 respectively, are held suspended one from the other. To keep the inner 106 and outer 104 portions of the housings aligned radially corresponding magnetic rings 120 and 122 are provided. These have a plurality of magnets embedded or located therein such that like polarities repel each other as indicated at arrows 124 and 126.

It is contemplated that the device 10 could be made substantially from a light material such as a plastic. Other materials, such as various metals and alloys could, of course, be used depending on the use to which the novel magnetic bearing assembly is being put.

The present invention could also be powered by electromagnets (not shown). Additionally, various brush contact elements such as are used in rotor/stator configurations could be incorporated into the device. The novel magnetic bearing assembly could be internally or externally cooled to increase the strength of the magnetic fields. Another use of the invention could be as a flywheel storage device using some sort of frictional clutch assembly (not shown) to add or to remove torque from the apparatus.

It is to be understood that the present invention is not limited to the embodiments described above, but encompasses any and all embodiments within the scope of the following claims.

I claim:

1. A magnetic bearing assembly having an axis of rotation, said magnetic bearing assembly comprising:

a turntable having a first radially magnetized ring and a first axially magnetized ring; and a housing surrounding and beneath said turntable, said housing having a second radially magnetized ring and a second axially magnetized ring; wherein said first radially magnetized ring has a first inner surface, a first outer surface and a first plurality of cylindrical magnets, said first plurality of cylindrical magnets being oriented such that all of the magnets of said first plurality of cylindrical magnets have the same magnetic pole on said first inner surface and the opposite magnetic pole on said first outer surface;

said second radially magnetized ring is mounted around said first radially magnetized ring and includes a second inner surface adjacent said first outer surface, a second outer surface and a second plurality of cylindrical magnets, said second plurality of cylindrical magnets being oriented such that all of the magnets of said second plurality of cylindrical magnets have the same magnetic pole on said second inner surface and the opposite magnetic pole on said second outer surface;

said magnetic pole on said second inner surface being the same as said magnetic pole on said first outer surface, such that said second inner surface and said first outer surface repel one another, to center said turntable relative to said housing;

said first axially magnetized ring has a first top surface, a first bottom surface and a third plurality of cylindrical magnets, said third plurality of cylindrical magnets being oriented such that all of the magnets of said third plurality of cylindrical magnets have the same magnetic pole on said first top surface and the opposite magnetic pole on said first bottom surface;

said second axially magnetized ring is mounted below said first axially magnetized ring and includes a second top surface adjacent and below said first bottom surface, a second bottom surface and a fourth plurality of cylindrical magnets, said fourth plurality of cylindrical magnets being oriented such that all of the magnets of said fourth plurality of cylindrical magnets have the same magnetic pole on said second top surface and the opposite magnetic pole on said second bottom surface;

said magnetic pole on said second top surface being the same as said magnetic pole on said first bottom surface, such that said second top surface and said first bottom surface repel one another, to support said turntable above said housing.

2. A magnetic bearing assembly having an axis of rotation, said magnetic bearing assembly comprising:

an inner housing having a first and a second radially magnetized ring and a first and a second axially magnetized ring;

an outer housing surrounding said inner housing, said outer housing having a first end, a second end, and a third and a fourth radially magnetized ring;

a first end cap mounted on said first end of said outer housing, said first end cap having a third axially magnetized ring; and a second end cap mounted on said second end of said outer housing, said second end cap having a fourth axially magnetized ring; wherein said first radially magnetized ring has a first inner surface, a first outer surface and a first plurality of cylindrical magnets, said first plurality of cylindrical magnets being oriented such that all of the magnets of said first plurality of cylindrical magnets have the same magnetic pole on said first inner surface and the opposite magnetic pole on said first outer surface;

said second radially magnetized ring has a second inner surface, a second outer surface and a second plurality of cylindrical magnets, said second plurality of cylindrical magnets being oriented such that all of the magnets of said second plurality of cylindrical magnets have the same magnetic pole on said second inner surface and the opposite magnetic pole on said second outer surface;

said third radially magnetized ring is mounted around said first radially magnetized ring and includes a third inner surface adjacent said first outer surface, a third outer surface and a third plurality of cylindrical magnets, said third plurality of cylindrical magnets being oriented such that all of the magnets of said third plurality of cylindrical magnets have the same magnetic pole on said third inner surface and the opposite magnetic pole on said third outer surface;

said magnetic pole on said third inner surface being the same as said magnetic pole on said first outer surface, such that said third inner surface and said first outer surface repel one another;

said fourth radially magnetized ring is mounted around said second radially magnetized ring and includes a fourth inner surface adjacent said second outer surface, a fourth outer surface and a fourth plurality of cylindrical magnets, said fourth plurality of cylindrical magnets being oriented such that all of the magnets of said fourth plurality of cylindrical magnets have the same magnetic pole on said fourth inner surface and the opposite magnetic pole on said fourth outer surface;

said magnetic pole on said fourth inner surface being the same as said magnetic pole on said second outer surface, such that said fourth inner surface and said second outer surface repel one another;

said first axially magnetized ring has a first inside surface, a first outside surface and a fifth plurality of cylindrical magnets, said fifth plurality of cylindrical magnets being oriented such that all of the magnets of said fifth plurality of cylindrical magnets have the same magnetic pole on said first inside surface and the opposite magnetic pole on said first outside surface;

said second axially magnetized ring has a second inside surface, a second outside surface and a sixth plurality of cylindrical magnets, said sixth plurality of cylindrical magnets being oriented such that all of the magnets of said sixth plurality of cylindrical magnets have the same magnetic pole on said second inside surface and the opposite magnetic pole on said second outside surface;

said third axially magnetized ring is mounted next to said first axially magnetized ring and includes a third inside surface adjacent said first outside surface, a third outside surface and a seventh plurality of cylindrical magnets, said seventh plurality of cylindrical magnets being oriented such that all of the magnets of said seventh plurality of cylindrical magnets have the same magnetic pole on said third inside surface and the opposite magnetic pole on said third outside surface;

said magnetic pole on said third inside surface being the same as said magnetic pole on said first outside surface, such that said third inside surface and said first outside surface repel one another;

said fourth axially magnetized ring is mounted next to said second axially magnetized ring and includes a fourth inside surface adjacent said second outside surface, a fourth outside surface and an eighth plurality of cylindrical magnets, said eighth plurality of cylindrical magnets being oriented such that all of the magnets of said eighth plurality of cylindrical magnets have the same magnetic pole on said fourth inside surface and the opposite magnetic pole on said fourth outside surface; and said magnetic pole on said fourth inside surface being the same as said magnetic pole on said second outside surface, such that said fourth inside surface and said second outside surface repel one another.

3. The magnetic bearing assembly according to claim 2, wherein:

said inner housing includes at least one shaft extending along the axis of rotation;

said first end cap includes a first central hole;

said second end cap includes a second central hole; and said at least one shaft extends out of said outer housing and through said first and second central holes.

4. The magnetic bearing assembly according to claim 2, wherein said inner and said outer housing are substantially cylindrical and are arranged along the axis of rotation.

* * * * *